(12) United States Patent
Croopnick

(10) Patent No.: US 6,376,091 B1
(45) Date of Patent: Apr. 23, 2002

(54) ARTICLE INCLUDING A COMPOSITE OF UNSTABILIZED ZIRCONIUM OXIDE PARTICLES IN A METALLIC MATRIX, AND ITS PREPARATION

(75) Inventor: Gerald A. Croopnick, Coto de Caza, CA (US)

(73) Assignee: Amorphous Technologies International, Laguna Niguel, CA (US)

( * ) Notice: Subject to any disclaimer, the term of this patent is extended or adjusted under 35 U.S.C. 154(b) by 0 days.

(21) Appl. No.: 09/650,977

(22) Filed: Aug. 29, 2000

(51) Int. Cl.[7] .................... B32B 15/04; C23C 4/04; C23C 4/06
(52) U.S. Cl. ............... 428/472; 428/469; 428/632; 428/640; 428/699; 428/702; 427/453
(58) Field of Search .................. 427/446, 449, 427/453, 455, 456; 428/615, 469, 472, 632, 640, 699, 702; 416/241 R, 241 B

(56) References Cited

U.S. PATENT DOCUMENTS 4,725,512 A    2/1988  Scruggs
5,288,344 A    2/1994  Peker et al.
6,128,029 A1 * 4/2001  Rickerby

FOREIGN PATENT DOCUMENTS

GB    2130244 A * 5/1984

* cited by examiner

*Primary Examiner*—Deborah Jones
*Assistant Examiner*—Jennifer McNeil
(74) *Attorney, Agent, or Firm*—Gregory Garmong

(57) ABSTRACT

An article includes a substrate and a composite material bonded to the substrate. The composite material includes a matrix consisting of a metallic alloy having a solidus temperature of at least about 700° C. and a plurality of unstabilized zirconium oxide particles distributed throughout the metallic alloy. The article is prepared by combining a precursor of the metallic alloy and the mass of unstabilized zirconium oxide powder to form a mixture, and applying the mixture as a heterogeneous composite material to a substrate to form the article. The step of applying occurs at an application temperature of greater than the solidus temperature of the metallic alloy.

20 Claims, 4 Drawing Sheets

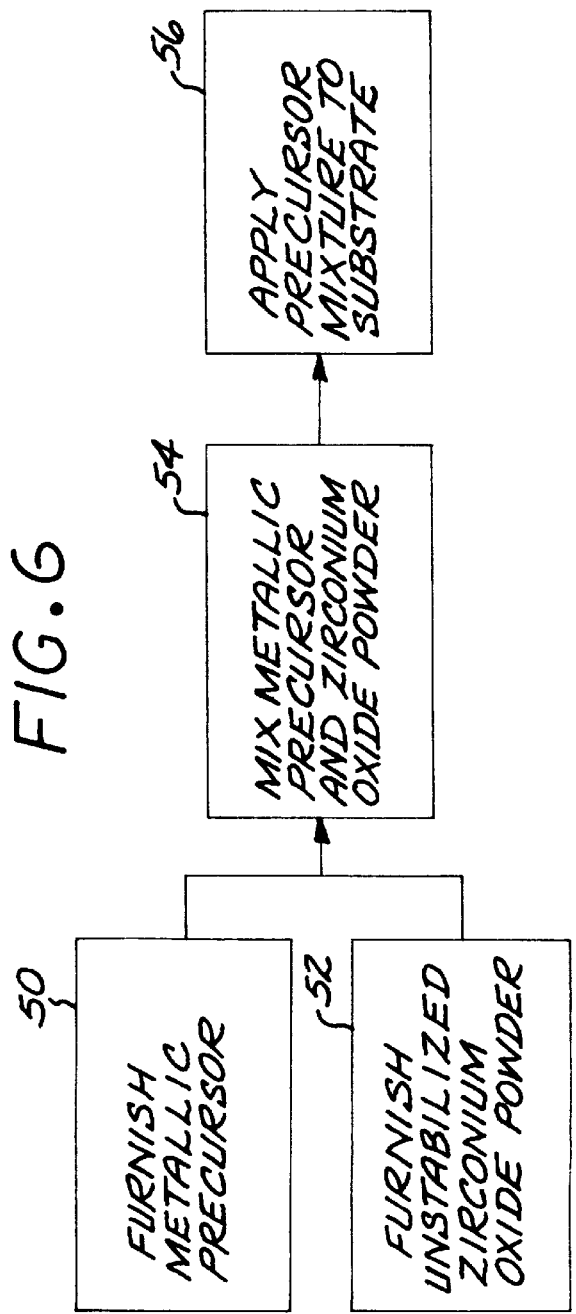
FIG.7
FIG.6
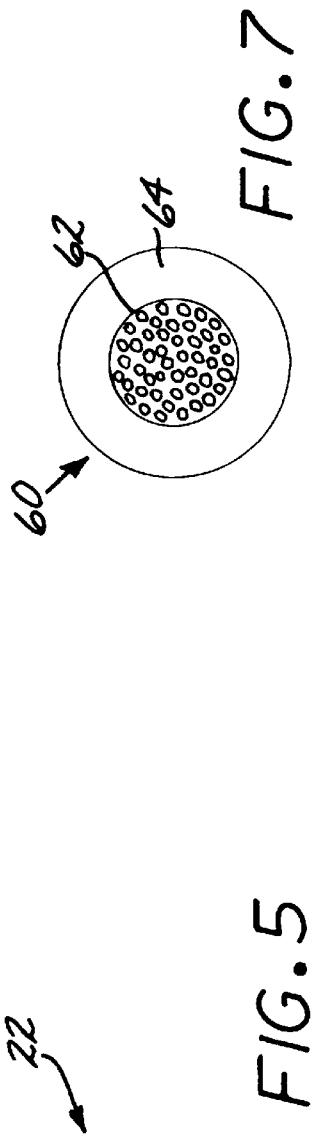
FIG.5

ARTICLE INCLUDING A COMPOSITE OF UNSTABILIZED ZIRCONIUM OXIDE PARTICLES IN A METALLIC MATRIX, AND ITS PREPARATION

This invention relates to metallic articles having a substrate and a composite material applied thereto, where the composite is formed of unstabilized zirconium oxide particles embedded in a metal matrix, and to the preparation of such articles.

BACKGROUND OF THE INVENTION

When some metals are cooled at a relatively high rate and in circumstances where their contraction is constrained, they have a tendency to crack and/or become porous. For example, weldments such as hard facings and thermally sprayed metallic coatings applied and bonded to a substrate are rapidly cooled during the application process. The metal is applied to a surface of the substrate in a partially or fully molten state and then cooled rapidly through the solidus temperature and to a lower temperature.

During the cooling, differential thermal strains arise because the contraction of the solidified surface of the applied metal is constrained by the neighboring substrate material to which it is adhered by the application process. The differential thermal strains produce thermal stresses. If the thermal stresses exceed the fracture strength of the applied metal or if the differential thermal strains exceed the fracture strain of the applied metal, the applied metal fractures and a crack and/or internal porosity results. The crack and/or internal porosity results in reduced performance of the article.

There are numerous techniques used to lessen the incidence of cracking and/or internal porosity in these circumstances. Stronger, more ductile metals are used, where such metals are available to meet the specific service requirements. The substrate may be heated prior to the application of the metal and maintained at elevated temperature during application of the metal, to reduce the initial temperature range over which the applied metal is cooled. The substrate and applied metal are then cooled more slowly to room temperature, so that the metal has the opportunity to deform plastically. Stress-relieving heat treatments and/or special cooling procedures are used in some cases.

Each of these techniques has been successful in some circumstances, but they all add costs and/or manufacturing complexity, and additionally may impair the basic functionality of the applied metal and the final article. There is a need for an approach which reduces the incidence of cracking and/or porosity yet does not add significant cost and complexity and does not adversely affect the performance of the applied metal and the final article. The present invention fulfills this need, and further provides related advantages.

SUMMARY OF THE INVENTION

This invention provides an article having a metallic alloy composite applied as a deposit to a substrate, and a method for its preparation. The metallic alloy composite may be applied in any operable form, with a metallic weldment and a thermally sprayed coating being of most interest. The metallic material has a reduced incidence of differential thermal cracking and/or porosity as compared with conventional metallic alloys, without changing the composition of the basic metallic material. Application techniques for the metallic composite material of the invention are essentially the same as those used for conventional metallic alloys.

In accordance with the invention, a method of preparing an article comprises the steps of furnishing a precursor of a metallic alloy having a solidus temperature of at least about 700° C., and furnishing a mass of unstabilized zirconium oxide powder. The precursor of the metallic alloy and the mass of unstabilized zirconium oxide powder are combined to form a mixture. The mixture is applied as a heterogeneous composite material to a substrate to form the article. The composite material comprises a matrix consisting of the metallic alloy, and a plurality of unstabilized zirconium oxide particles distributed throughout the matrix. The step of applying occurs at an application temperature of greater than the solidus temperature of the metallic alloy. The step of applying occurs at a temperature which is no less than about 700° C., is preferably greater than about 950° C., and is most preferably greater than about 1200° C.

The step of applying is preferably performed by either forming a weldment or thermally spraying a powder or wire. A suitable welding rod or wire for use in welding or spraying may be made by placing the powder mixture into a tube and then extruding, drawing, or swaging the tube to size. Upon melting, the net composition is that desired in the final material. All of the materials both within the tube and forming the tube sheath, other than the unstabilized zirconium oxide, together constitute the precursor of the metallic alloy.

A wide variety of metals may be used, but the metallic matrix is preferably an amorphous alloy such as a frictionally transforming amorphous alloy. In one embodiment, the present approach is beneficially utilized when the matrix alloy (amorphous or non-amorphous) has a maximum strain to failure in tension of less than about 10 percent, preferably less than about 5 percent, at room temperature. The unstabilized zirconium oxide powder is present in an amount such that the metal/unstabilized zirconium oxide composite material is from about 0.2 volume percent to about 8 volume percent, more preferably from about 0.2 volume percent to about 4.5 volume percent, of the unstabilized zirconium oxide particles. The unstabilized zirconium oxide particles preferably have an average size of from about 1 micrometer to about 20 micrometers.

An article according to the present approach comprises a substrate, and a composite material bonded to the substrate. The composite material comprises a metallic matrix and a plurality of unstabilized zirconium oxide particles distributed throughout the metallic matrix.

When a metallic alloy solidifies and cools, it contracts. Because of thermal gradients within the metal and surface constraints on the contraction of the metal, if any, the amount of contraction at any moment varies from location to location, typically being larger near the surface and smaller near the center of the metallic mass. This variation leads to the potential for cracking and/or porosity in the metallic mass. The potential for cracking and/or porosity is particularly great when the metallic mass is affixed to a substrate, because of the different thermal expansion coefficients of the metallic mass and the substrate.

Unstabilized zirconium oxide (also known as zirconia) exhibits a phase transformation upon cooling from a high-temperature tetragonal phase to a low-temperature monoclinic phase over a phase transformation range of from about 950° C. down to about 700° C. This phase transformation is accompanied by a specific volume increase of the zirconium oxide upon cooling through the phase transformation temperature range. When embedded in a metallic matrix which exhibits a volume decrease as it cools, the expansion of the zirconium oxide during its phase transformation counteracts at least some of the contraction of the metal, serving to lessen the effects of thermal strains and stresses. The composite material of a metallic alloy matrix with unstabilized zirconium oxide particles embedded therein is therefore less susceptible to cracking and development of porosity than is a comparable metallic alloy without the unstabilized zirconium oxide particles present, particularly when the composite material is applied to and bonded to the substrate.

The present approach also reduces the incidence of warping of the article due to internal stresses and the incidence of bond line failures between the deposited composite material and the substrate. When a metal is deposited on a substrate, the differential thermal expansion properties of the metal and the substrate result in a tendency of the substrate to warp as the metal deposit and substrate are cooled, causing the substrate and metal deposit to "curl". This warping applies a stress to the bond line between the metal deposit and the substrate, effectively reducing its strength. In the present approach, the internal stresses and strains resulting from the difference in the thermal expansions of the metal deposit and the substrate are reduced, reducing the tendency to curl and also reducing the degradation of the bond-line strength.

The present invention is therefore limited to the composite material deposit of zirconium oxide particles in a metallic alloy matrix, applied and bonded to a substrate. The problems associated with deposits applied and bonded to substrates are different from those of materials which are not applied and bonded to substrates. Specifically, the differential thermal expansion between the substrate and the applied and bonded deposit is not present for the case of materials that are not applied and bonded to substrates.

In some other applications of zirconium oxide, the ceramic is stabilized by the addition of other oxides (such as yttrium oxide) to suppress the effects of the tetragonal/ monoclinic phase transformation. The present invention relies on beneficial results achieved through the operation of the phase transformation, and therefore unstabilized zirconium oxide must be used. Stabilized zirconium oxide is not operable in the present invention.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is an idealized microstructure of a composite material according to the invention;

FIG. 6 is a block flow diagram of an approach for practicing the invention;

FIG. 7 is a schematic sectional view of a welding rod or wire;

DETAILED DESCRIPTION OF THE INVENTION

Figure 1:
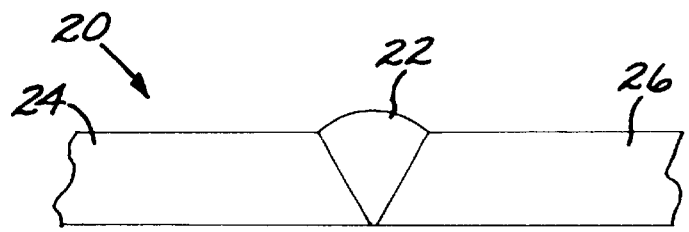
FIG. 1 is a schematic sectional view of a joining weldment.
Figure 2:
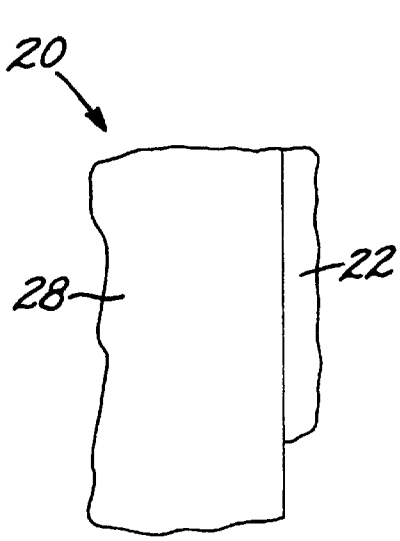
FIG. 2 is a schematic sectional view of an overlay weldment.
Figure 3:
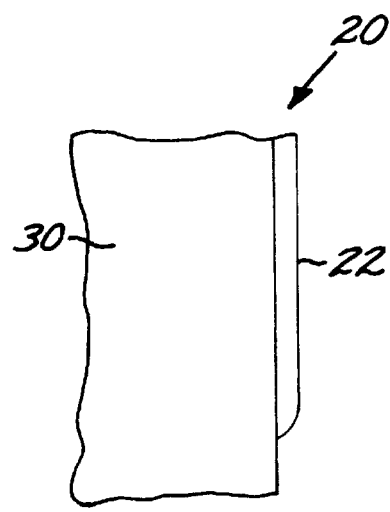
FIG. 3 is a schematic sectional view of a thermally sprayed deposit.
Figure 4:
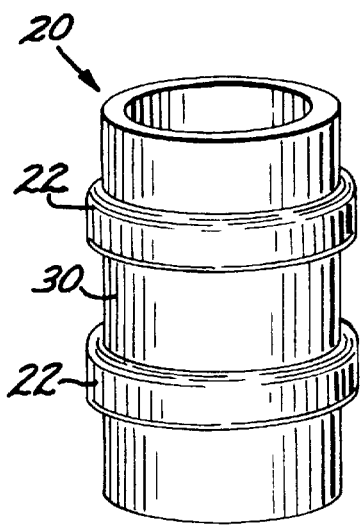
FIG. 4 is a schematic perspective view of hard-facing overlay bands on a piece of pipe.

The present approach may be used in a wide variety of applications. FIGS. 1–4 illustrate articles 20 of most interest to the present inventor which are prepared using a composite material 22 made according to the present approach. In FIG. 1, the composite material 22 is used as a joining weldment to join two metallic pieces 24 and 26. In FIG. 2, the composite material 22 is used as an overlay weldment (typically a hard facing) overlying a weld substrate 28. In FIG. 3, the composite material 22 is a thermally sprayed deposit overlying a deposition substrate 30. In FIG. 4, the composite material 22 is used as either an overlay weldment or a thermally sprayed deposit to form hard-facing bands on the substrate in the form of a piece of pipe. In each case the composite material 22 is applied to and bonded to the substrate. All of these embodiments are examples, and are not intended to be limiting of the scope of the invention.

FIG. 5 is an idealized magnified microstructure of the composite material 22. The composite material 22 includes a matrix 40 with a plurality of unstabilized zirconium oxide particles 42 embedded therein and distributed therein. It is preferred, but not necessary, that the unstabilized zirconium oxide particles 42 be generally evenly distributed throughout the matrix 40.

The matrix 40 consists essentially of a metallic material having a solidus temperature of at least about 700° C. The solidus temperature must be at least this high, or the phase transformation in the unstabilized zirconium oxide will have no beneficial effect because it occurs in the range of about 700° C. to about 950° C. Desirably, the solidus temperature of the metallic alloy of the matrix 40 is at least about 950° C., because the benefit of the phase transformation to metallic matrices having a solidus temperature between about 700° C. and about 950° C. is small but present. Most preferably, the solidus temperature of the metallic matrix alloy is at least about 1200° C. in order to achieve the maximum benefits of the invention.

In one embodiment, the metallic alloy used as the matrix 40 desirably has a maximum strain to failure in tension of less than about 10 percent, preferably less than about 5 percent, at room temperature. Such alloys include those which are typically strong, hard, and make excellent hard facing or weldment materials. If the maximum strain to failure of the metallic matrix alloy in tension is greater than about 10 percent at room temperature, the metallic alloy has sufficient ductility that internal stresses are relaxed through its own internal deformation processes, and the benefits gained by the incorporation of the unstabilized zirconium oxide are not as great as for metallic alloys of lower ductility. The performance of alloys having a maximum strain to failure in tension at room temperature of less than about 5 percent, when used as the matrix in a composite material applied to a substrate, is particularly enhanced.

The preferred metallic alloy for use as the matrix 40 is an amorphous alloy, preferably a bulk solidifying amorphous metallic alloy such as described in U.S. Pat. No. 5,288,344, or a frictionally transforming amorphous metallic alloy such as described in U.S. Pat. No. 4,725,512, whose disclosures are incorporated by reference. The preferred compositions are Annacor™ M alloy having a composition, in weight percent, of from about 1.1 to about 2.1 percent silicon, from about 26.5 to about 31.5 percent chromium, from about 1.1 to about 2.2 percent manganese, from about 3.35 to about 4.15 percent boron, balance iron; and Armacor™ M* alloy having a composition, in weight percent, of from about 0.6 to about 1.5 percent silicon, from about 25.5 to about 30 percent chromium, from about 1.2 to about 2.4 percent manganese, from about 3.2 to about 3.7 percent boron, from about 5.0 to about 7.0 percent nickel, balance iron. These metallic alloys, available from Amorphous Technologies International, Laguna Niguel, Calif., have solidus temperatures of about 1240° C. The present invention is not limited to amorphous metallic alloy matrices, and may be used with other metallic alloys meeting the requirements set forth herein.

The particles 42 are unstabilized zirconium oxide (also termed unstabilized zirconia). These particles 42 exhibit about 3–5 percent volume expansion as they are cooled through the tetragonal-to-monoclinic phase transformation in the range of about 950° C. down to about 700° C. The unstabilized zirconium oxide particles 42 preferably have an average particle size of from about 1 micrometer to about 20 micrometers, although particle sizes outside this range may also be used. If the particles are smaller than about 1 micrometer, they may be difficult to process. If the particles are larger than about 20 micrometers, they exhibit a reduced beneficial effect.

The unstabilized zirconium oxide particles 42 preferably comprise from about 0.2 volume percent to about 8 volume percent of the composite material 22. If the unstabilized zirconium oxide particles are present in an amount of less than about 0.2 volume percent of the composite material 22, their volume fraction is too small to have a useful beneficial effect. If the unstabilized zirconium oxide particles are present in an amount of more than about 8 volume percent of the composite material 22, the material cannot be processed properly. More preferably, the particles comprise from about 0.2 volume percent to about 4.5 volume percent of the composite material.

FIG. 6 is a block flow diagram of a preferred approach for practicing the invention. A precursor of a metallic alloy is furnished, numeral 50. The precursor may be a metallic powder, a non-powder metal, or a combination thereof. The precursor may also include nonmetallic components, other than zirconium oxide. Any metallic powder preferably has a particle size of from about –60 mesh (250 micrometers) to about –325 mesh (44 micrometers), although these sizes are not critical, particularly in view of the fact that the metallic powder is at least partially melted during the subsequent processing steps.

Other components may be included in the metallic precursor as required to achieve the desired composition of the final product. For example, iron-boride (FeB) powder may be used as a source of boron, manganese silicide (MnSi) powder may be used as a source of manganese and silicon, chromium (Cr) powder may be used as a source of chromium, and nickel (Ni) powder may be used as a source of nickel.

A mass of unstabilized zirconium oxide particles is furnished, numeral 52. The unstabilized zirconium oxide particles are of the types, sizes, and amount (relative to the amount of the metallic alloy powder) as discussed earlier.

The metallic precursor and the mass of unstabilized zirconium oxide powder are mixed together to form a precursor mixture, numeral 54. Mixing is by any operable approach that achieves a generally homogeneous blend of the powders.

The precursor mixture is applied as the heterogeneous composite material to the substrate to form the article, numeral 56. The resulting composite material 22 comprises the matrix 40 consisting of the metallic alloy formed from the metallic precursor and the plurality of unstabilized zirconium oxide particles 42 distributed throughout the matrix 40, as illustrated in FIG. 5. At least a portion of the step of applying 56 occurs at an application temperature of no less than about 700° C., more preferably at no less than about 950° C. In any event, the step of applying requires that the matrix alloy be heated above its solidus temperature so that it is at least partially melted.

The application of the powder mixture to form the composite material may be accomplished in any operable manner. Two approaches are of primary interest at this time. In welding, a source of weld or thermal spray material is prepared and then applied. Any operable source of the weld or thermal spray material may be used. FIG. 7 illustrates a rod or wire 60 that is used as a source of weld or thermal spray material. The rod or wire is prepared by placing the powder mixture 62 inside a tube 64 that serves as a sheath material, and then sealing the ends. The tube 64 is preferably a ductile metal. The rod or wire 60 is readily formed by making a U-shaped piece of the sheath material, placing the powder mixture 62 into the U, and then closing the legs of the U together and sealing them to define the tube 64. The tube is reduced to the required size of the rod or wire by extrusion, wire drawing, swaging, or the like.

In an example of producing a rod or wire of the Armacor™ M material with added unstabilized zirconium oxide, a powder mixture having a weight composition of 43 percent chromium, 4 percent FeSi, 49 percent FeB, and 4 percent MnSi, together with an amount of unstabilized zirconium oxide sufficient to yield the desired volume percentage, about 2.25 volume percent of the total volume of the rod or wire in the example, was prepared. About 43 parts by weight of this powder mixture was incorporated into a tube sheath of about 57 parts by weight of 430 type stainless steel. The tube was extruded to form wire.

In an example of producing a rod or wire of the Armacor™ M* material with added unstabilized zirconium oxide, a powder mixture having a weight composition of 42 percent chromium, 5 percent FeSi, 52 percent FeB, and 1 percent MnSi, together with an amount of unstabilized zirconium oxide sufficient to yield the desired 2.25 volume percentage, was prepared. About 35 parts by weight of this powder mixture was incorporated into a tube sheath of about 65 parts by weight of 304 type stainless steel. The tube was extruded to form wire.

The rod or wire 60 may be used to weld two pieces 24 and 26 together as in FIG. 1, with the melted rod or wire 60 forming the composite material weldment 22. The rod or wire 60 may instead be used to deposit the overlay weldment of FIG. 2 or FIG. 4. The rod or wire 60 may instead be used as the wire feed for a plasma spray apparatus such as a twin-wire arc spray (TWAS) apparatus. In each case, the rod or wire 60 is heated to a temperature greater than 700° C., and preferably heated to a temperature greater than about 950° C., and in any event heated to a temperature above the solidus temperature of the final weldment or deposit. These examples of the rod or wire 60 as the source of the weld material and the welding techniques are examples presented as the preferred welding approach, but other operable approaches may be used instead. When the rod or wire is melted by heating above the solidus temperature, the constituents of the rod or wire other than the unstabilized zirconium oxide powder, including the other powders inside the sheath and the sheath itself, together serve as the precursor of the metallic alloy.

In another approach, the application step 56 utilizes any operable powder thermal spray technique. In these techniques, the powder mixture having the desired net composition is supplied to a spray apparatus, which heats the powder mixture to a temperature greater than 700° C., preferably greater than about 950° C., and in any event above the solidus temperature of the net composition, and then directs a flow of the heated mixture against the substrate 30, to form the composite material deposit 22 of FIG. 3 or FIG. 4. The powder mixture may be formed either before or after the powders enter the spray apparatus. Here, the constituents of the powder mixture, other than the unstabilized zirconium oxide powder, serve as the precursor of the metallic alloy.

Figure 8A:
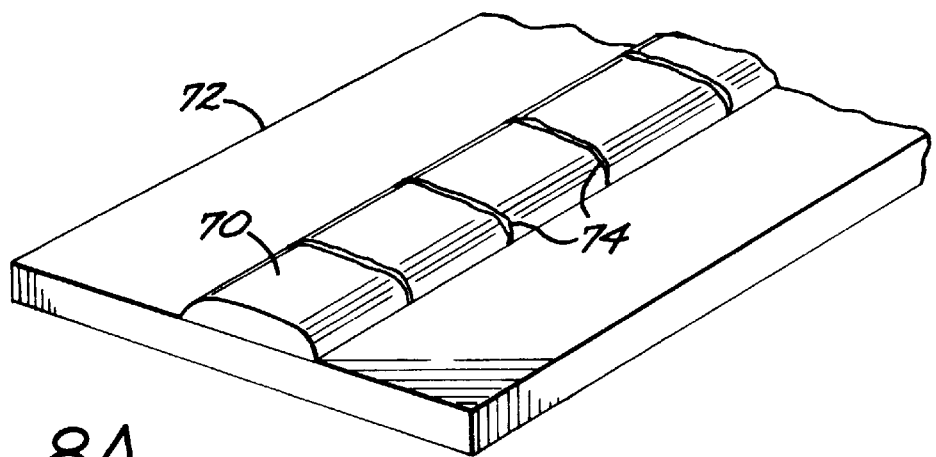
FIGS. 8A–8B schematically illustrate a perspective view of a weld bead, wherein the weld bead of FIG. 8A is made of the matrix alloy with no zirconium oxide particles present, and the weld bead of FIG. 8B is made of the composite material of unstabilized zirconium oxide particles embedded in the matrix alloy.
Figure 8B:
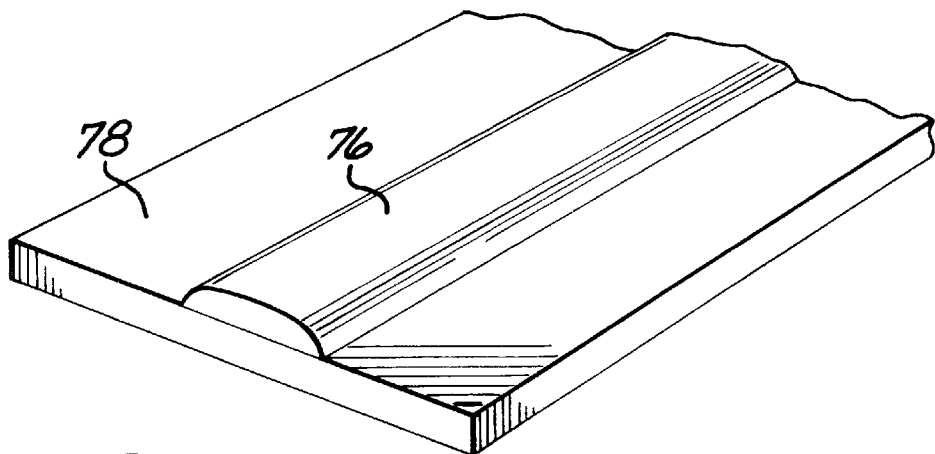

The present invention has been reduced to practice by both MIG welding and twin-wire arc spray, in comparative tests to determine the effect of the presence of the unstabilized zirconium oxide particles. FIG. 8A illustrates a MIG weld bead 70 on a substrate 72, where the weld bead 70 is formed of the Armacor™ M* material with no zirconium oxide present. Periodic cracks 74 are observed along the length of the weld bead 70. FIG. 8B illustrates a MIG weld bead 76 on a substrate 78, where the weld bead 76 is formed of a composite material of the Armacor™ M* material with about 2.25 percent by volume of unstabilized zirconium oxide particles present. There are no cracks. (In FIG. 8B, the unstabilized zirconium oxide particles are present but are too small to be seen in the scale of the drawing.)

Figure 9A:
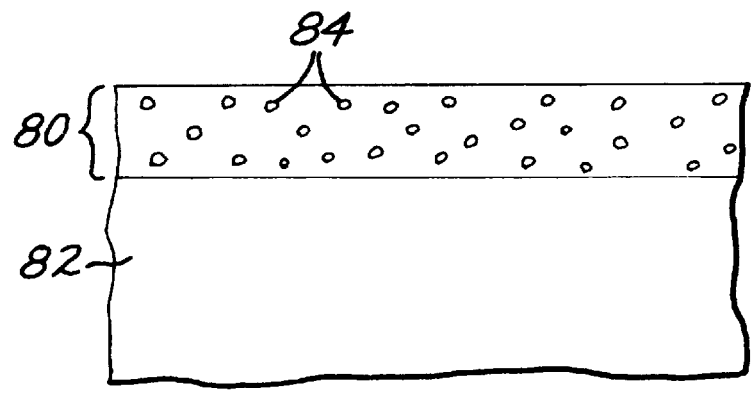
FIGS. 9A–9B schematically illustrate a sectional view of a weld overlay deposited on a substrate, wherein the weld overlay of FIG. 9A is made of the matrix alloy with no zirconium oxide present, and the weld overlay of FIG. 9B is made of the composite material of zirconium oxide particles embedded in the matrix alloy.
Figure 9B:
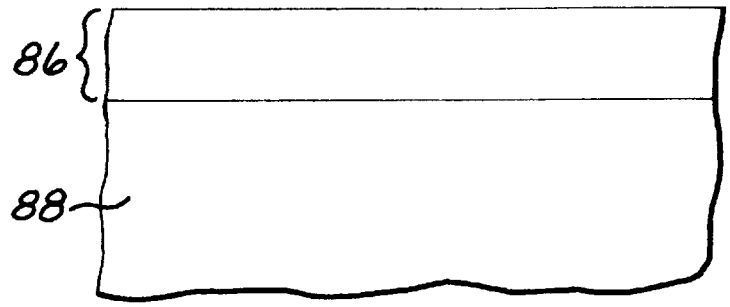

FIG. 9A illustrates the microstructure of a TWAS weld overlay hard facing 80 on a substrate 82, such as the pipe substrate of FIG. 4, where the weld overlay hard facing is formed of the Armacor™ M* material with no zirconium oxide present. A substantial amount of porosity 84 is present. FIG. 9B illustrates the microstructure of a TWAS weld overlay hard facing 86 on a substrate 88, such as the pipe substrate of FIG. 4, where the weld overlay hard facing is formed of the Armacor™ M* material with about 2.25 percent by volume of unstabilized zirconium oxide particles present. There is substantially no porosity present. (In FIG. 9B, the unstabilized zirconium oxide particles are present but are too small to be seen in the scale of the drawing.)

When the overlay hard facing 80 of FIG. 9A is surface polished, it has a matte finish suggestive of porosity, and in fact the micrographic studies show that there is a substantial amount of porosity present. When the overlay hard facing 86 of FIG. 9B is polished, it has a smooth, shiny appearance with no indication of porosity, and in fact the micrographic studies show that there is substantially no porosity present.

The achieving of an absence or near-absence of cracking and porosity in the materials of the present invention, without changing the composition of the matrix material, is an important advantage of the invention. The composition of the matrix material may not be changed, or the required properties (such as the hardness and amorphous character) will be lost. The cracking and/or porosity reduces strength and wear resistance, as well as provides paths for corrosive chemicals to reach the underlying substrate. The present approach avoids or at least greatly reduces crack and/or porosity that lead to these reductions in mechanical and physical properties, but the addition of the zirconium oxide particles.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of preparing an article, comprising the steps of
    furnishing a precursor of a metallic alloy having a solidus temperature of at least about 700° C.;
    furnishing a mass of unstabilized zirconium oxide powder;
    combining the precursor of the metallic alloy and the mass of unstabilized zirconium oxide powder to form a mixture; and
    applying the mixture as a heterogeneous composite material to a substrate to form the article, the composite material comprising a matrix consisting of the metallic alloy and a plurality of unstabilized zirconium oxide particles distributed throughout the matrix, the step of applying to occur at an application temperature of greater than the solidus temperature of the metallic alloy.

2. The method of claim 1, wherein the step of combining includes the step of
    placing a powder mixture into a tube.

3. The method of claim 1, wherein the step of applying includes the step of
    forming a weldment of the composite material.

4. The method of claim 1, wherein the step of applying includes the step of
    thermally spraying the composite material.

5. The method of claim 1, wherein the step of furnishing a precursor includes the step of
    furnishing a precursor of an amorphous alloy.

6. The method of claim 1, wherein the step of furnishing a precursor includes the step of
    finishing a precursor of a frictionally transformable amorphous alloy.

7. The method of claim 1, wherein the step of furnishing a mass of unstabilized zirconium oxide powder includes the step of
    furnishing a sufficient amount of unstabilized zirconium oxide powder such that the unstabilized zirconium oxide particles comprise from about 0.2 volume percent to about 8 volume percent of the composite material.

8. The method of claim 1, wherein the step of furnishing a mass of unstabilized zirconium oxide powder includes the step of
    furnishing a sufficient amount of unstabilized zirconium oxide powder such that the unstabilized zirconium oxide particles comprise from about 0.2 volume percent to about 4.5 volume percent of the composite material.

9. The method of claim 1, wherein the unstabilized zirconium oxide particles have an average particle size of from about 1 micrometers to about 20 micrometers.

10. The method of claim 1, wherein the matrix has a strain to failure of less than about 10 percent at room temperature.

11. The method of claim 1, wherein the metallic alloy has a solidus temperature of at least about 950° C.

12. The method of claim 1, wherein the metallic alloy has a solidus temperature of at least about 1200° C.

13. An article comprising:

a substrate; and a composite material bonded to the substrate, the composite material comprising a matrix consisting of a metallic alloy having a solidus temperature of at least about 700° C., and a plurality of unstabilized zirconium oxide particles distributed throughout the metallic alloy matrix.

14. The article of claim 13, wherein the article is a weldment.

15. The article of claim 13, wherein the article is a thermally sprayed deposit.

16. The article of claim 13, wherein the article is a hard facing.

17. The article of claim 13, wherein the metallic alloy comprises an amorphous metal.

18. The article of claim 13, wherein the metallic alloy comprises a frictionally transformable amorphous metal.

19. The article of claim 13, wherein the unstabilized zirconium oxide particles comprise from about 0.2 volume percent to about 8 volume percent of the composite material.

20. The article of claim 13, wherein the unstabilized zirconium oxide particles comprise from about 0.2 volume percent to about 4.5 volume percent of the composite material.

* * * * *